Aug. 2, 1949.                J. N. BAKER                2,477,854
                    HYDRAULIC JACK WEIGHING DEVICE
Filed June 16, 1945                              4 Sheets-Sheet 1

Inventor
James N. Baker
By Thomas W. J. Clark
Attorney

Witness
Porter N. Hauth

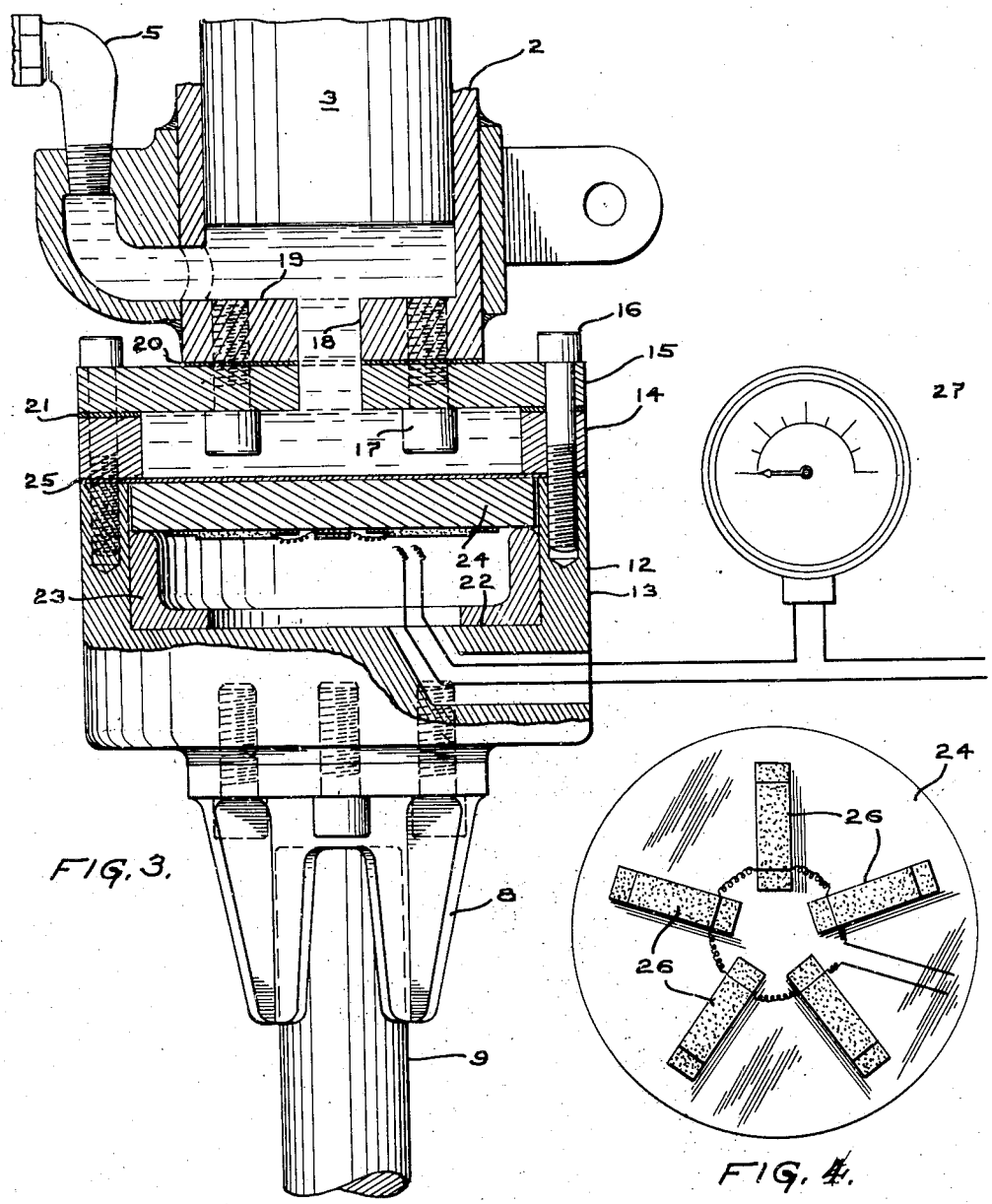

Aug. 2, 1949.    J. N. BAKER    2,477,854
HYDRAULIC JACK WEIGHING DEVICE
Filed June 16, 1945    4 Sheets-Sheet 3
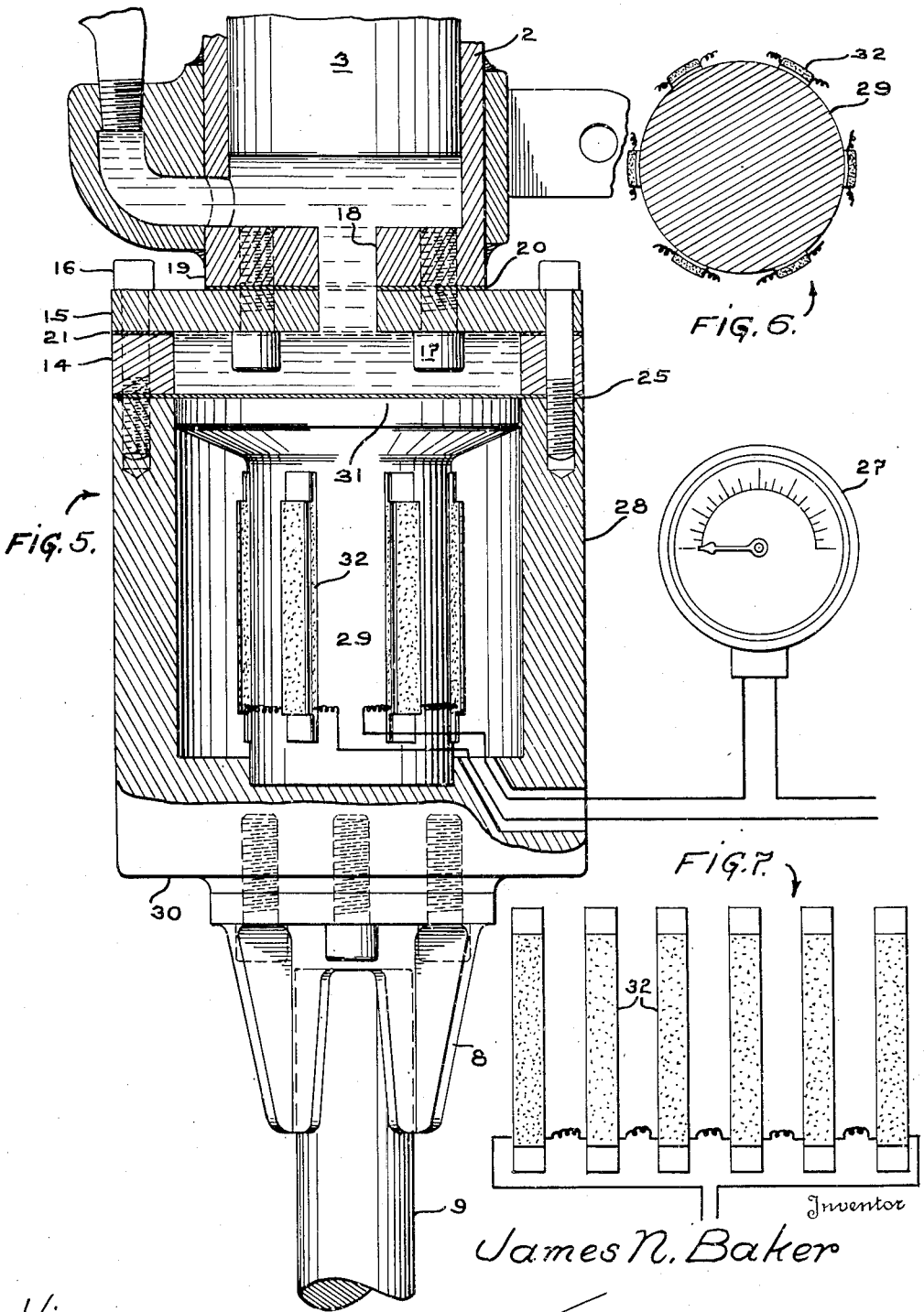
Witness
Inventor
James N. Baker
By ..... Attorney

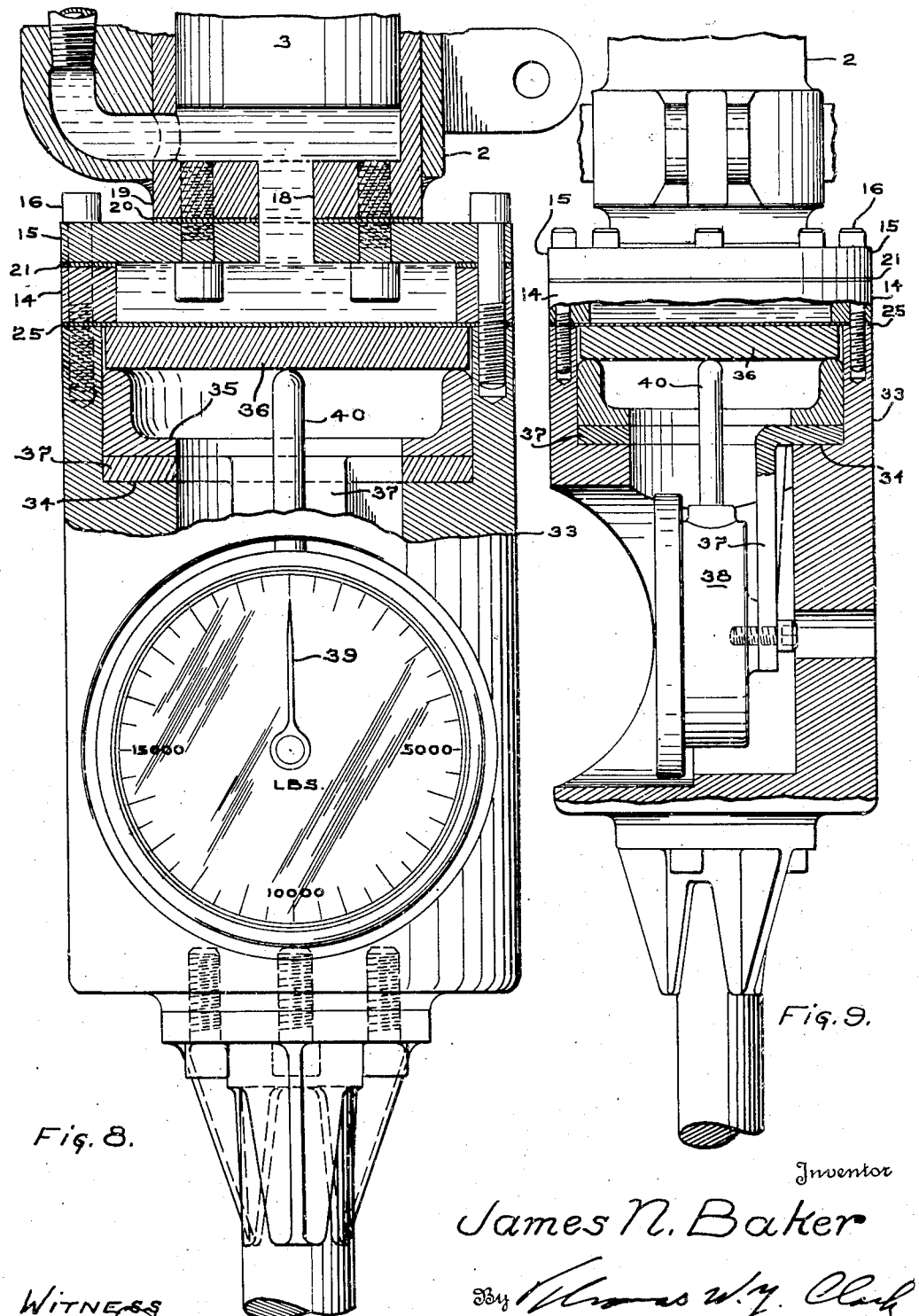

Patented Aug. 2, 1949

2,477,854

UNITED STATES PATENT OFFICE 2,477,854

HYDRAULIC JACK WEIGHING DEVICE

James N. Baker, Baltimore, Md., assignor to The Black and Decker Manufacturing Company, a corporation of Maryland Application June 16, 1945, Serial No. 599,912

9 Claims. (Cl. 265—47)

This invention relates to a weighing device primarily for weighing aircraft although it may be used with other hydraulic jacks. In the weighing of aircraft it is important to obtain the overall weight of the aircraft and at times to obtain the distribution of the load in the aircraft. For this purpose a hydraulic jack is frequently used which may be adjusted to various heights. After placing the jack under the part of the aircraft to be lifted by the jack to ascertain the weight of that part of the aircraft, fluid is forced into the hydraulic cylinder and the aircraft lifted. In the present invention an opening is made in the fluid cylinder to allow a portion of the fluid to flow into another chamber which has means therein to determine the pressure of the fluid and thereby to determine the weight on the jack exerted by that part of the aircraft.

In the pending application Serial No. 572,179, filed January 10, 1945, various electrical mechanisms are suggested for obtaining the weight exerted on various forms of weighing scales. It is an object of this invention to adapt the form of scales shown in that application to the particular purpose of weighing aircraft by means of hydraulic jacks. Some of the forms of scales or weighing devices shown in that application have been employed with hydraulic jacks in the weighing of aircraft but they have not been entirely successful. The present invention has been eminently successful for that purpose.

Several tripods combined with several weighing devices may be used at the same time to lift and weigh the whole plane, and the result of all the weighing devices may be totalized in the manner described in the pending application referred to.

Another important feature of the invention is that it can be applied to the present hydraulic jacks with a minimum of alteration and with no interference with their present form of operation.

Other objects and advantages of the invention will be apparent from the following description and the accompanying drawings forming a part hereof and in which:

Figure 3 is a vertical sectional view of the weighing device shown in Figure 1.

Figure 4 is an inverted plan view of the pressure plate of Figure 3.

Figure 5 is a vertical sectional view of another modification of weighing device.

Figure 6 is a horizontal sectional view of the anvil supporting column of Figure 5.

Figure 7 is an elevational view of the resistance means used on the column in extended formation.

Figure 8 is an elevational view, partly in section, of the weighing device of Figure 2.

Figure 9 is a vertical section thereof.

In the drawing similar numerals refer to similar parts throughout the several views.

Figures 1, 2:
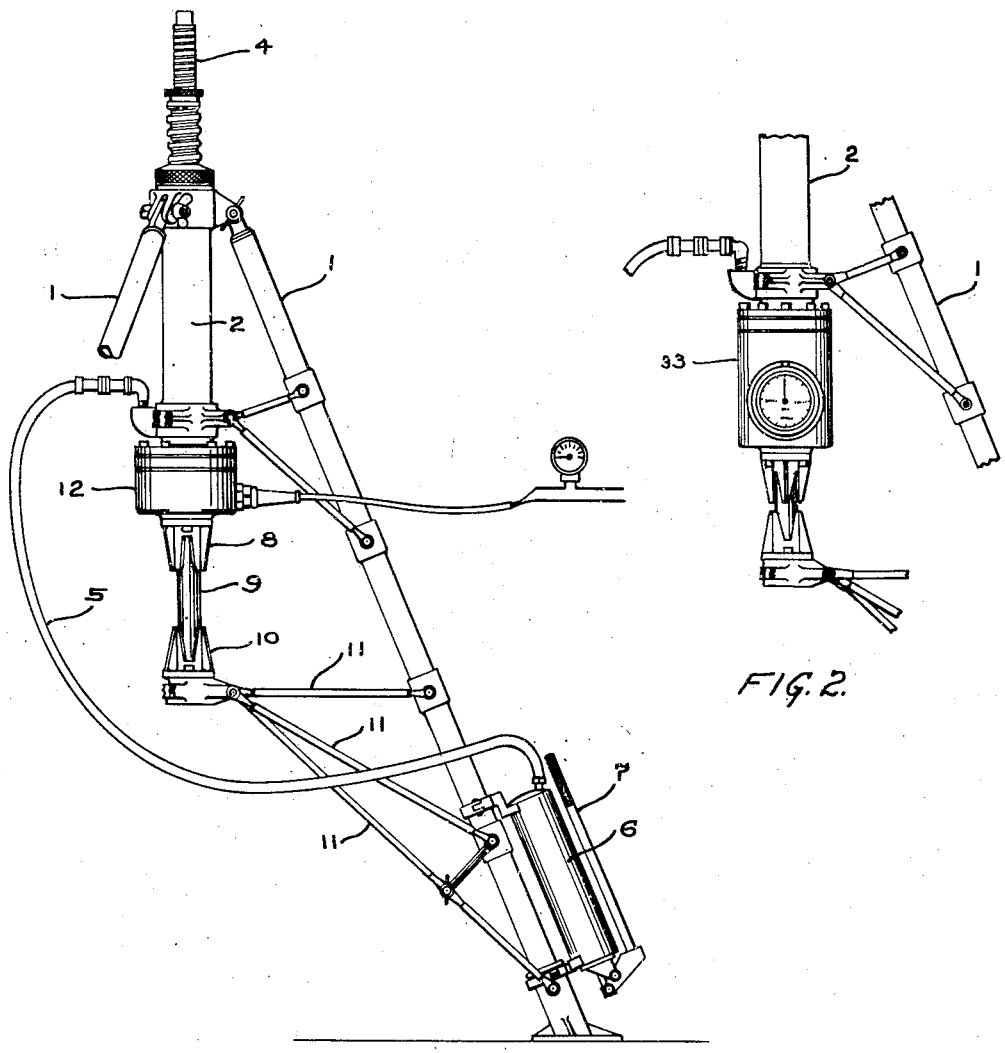
Figure 1 is an elevational view of a portion of a hydraulic jack embodying this invention.
Figure 2 is a similar view of a portion of such a jack embodying a modification of the weighing device shown in Figure 1.

The aircraft jack of the tripod type is adaptable for adjustment in sections from a comparatively low position to a relatively high position to reach under the high parts of the largest aircraft as they rest upon the ground. The legs 1 are in sections and they support the fluid cylinder 2 which has therein a plunger 3 bearing up upon the member 4 which is placed under the aircraft.

The fluid cylinder 2 has a hose connection 5 with a tank 6 having a hand pump 7. Working the hand pump 7 forces fluid into the cylinder 2 to raise the plunger 3 under the load on the jack. In the ordinary type of aircraft jack the bracket 8 is attached immediately to the bottom of the cylinder 2 and a reach rod 9 is placed in this bracket and in a corresponding opposed bracket 10 which is held in firm vertical position by the jack legs by means of stays 11. In the instant invention the bracket 8 is attached to the bottom of the weighing device 12 which is attached immediately to the bottom of the cylinder 2 of the jack.

In the form of the invention shown in Figures 1, 3 and 4 the weighing device 12 consists of a cylindrical body 13 with a ring 14 and a top plate 15, the top plate and ring being securely held to the body 13 by means of screws 16. The top plate 15 is likewise securely held to the bottom of cylinder 2 by means of screws 17. A fluid passage 18 is cut through the bottom 19 of the cylinder 2 and connects with a similar passage in the top plate 15 of the weighing device. Gaskets 20 and 21 seal the connections between the bottom 19 and top plate 15 and top plate 15 and ring 14 respectively.

Resting upon the bottom 22 of the body 13 is a bearing ring 23 supporting pressure plate 24. Between ring 14 and body 13 and resting upon pressure plate 24 is a diaphragm 25. Fluid in the chamber of cylinder 2 passes into the chamber formed in the weighing device 12 and the pressure exerted by the fluid is transmitted directly to the pressure plate 24. The diaphragm 25 makes a secure connection for transmitting the pressure exerted by the fluid. The pressure plate 24 is preferably of steel and is elastic and bends under the pressure of the fluid. Its tendency is to sag or bow in the center, being supported by the bearing ring 23.

On the bottom of this pressure plate 24 are a plurality of electrical conductor resistance elements 26. These elements are securely fastened at each end as well as throughout their body and any deflection of the elastic pressure plate 24 will vary the amount of their resistance in proportion to the amount of the deflection. The deflection increases the resistance of the elements. The resistance variation of the elements is measured upon the scale or gauge 27 and this gauge may be calibrated in pounds, the zero point of the gauge indicating no deflection of the pressure plate 24 and any deflection can therefore be read directly in pounds from the scale so that the variation in the resistance of the elements 26 will record the deflection in the pressure plate 24 which in turn is directly proportional to the pressure on the fluid within the weighing device and within the cylinder 2 bearing up the plunger 3.

The electrical conductor resistance elements 26 may be of any of the three forms shown in the above mentioned application. They may be either commercial strain gauges or the carbon pile, or the air gap of a magnetic circuit may be used to show or reflect the deflections in the pressure plate 24. These different mechanisms for ascertaining this deflection are clearly described in the aforesaid pending application.

The modification of Figure 5 has a deeper body 28 with a column 29 resting in a recess in the bottom 30 of the body 28. Column 29 has integrally therewith anvil 31 which bears upon a diaphragm 25 like that described in relation to the preceding modification. The column 29 is likewise elastic being made of steel. Around the column 29 are placed a plurality of electrical conductor resistance elements 32. These are connected together in series as shown in Figure 7. Pressure on the anvil shortens the resistance elements and reduces their resistance, and that reduction is calibrated into pounds, and is read on gauge 27. The variation of resistance, reduction in the form illustrated, due to the load on the jack transmitted through the fluid, the anvil and the column to the electrical conductor resistance elements 32 is measured by the dial on gauge 27.

Another modification of the invention operating on mechanical principles rather than electrical is shown in Figures 2, 8 and 9. In this modification the body 33 has shoulders 34 which support a bearing ring 35 which supports in turn the pressure plate 36 which is of similar construction to the pressure plate of Figure 3. Supported on the shoulders 34 below ring 35 is a shouldered bracket 37 which supports the gauge 38 rigidly with respect to the body 33. Deflections from the pressure plate 36 are transmitted to the indicator 39 of the gauge by means of the stem 40 of the gauge which is in direct contact with the center of the pressure plate 36. The gauge 38 is calibrated so that a deflection of .010 inch on the pressure plate will transmit to the indicator 39 a complete revolution. The gauge may be calibrated in pounds so that the weight upon the hydraulic jack will be directly measured mechanically.

It will be apparent that the same electrical conductor resistance elements described in connection with the modification of Figure 3 may likewise be used in connection with the modification of Figure 5.

It will be apparent that many modifications may be made in the different species of the invention and in the details of construction and arrangement of the parts by those skilled in the art without departing from the invention as set forth in the appended claims.

What is claimed as new and is desired to be secured by Letters Patent is:

1. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, another wall of said walled chamber being deflectible by the pressure of said fluid in the walled chamber and means to measure the deflection of the deflectible wall and thereby to determine the weight on the jack.

2. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, another wall of said walled chamber being deflectible by the pressure of said fluid in the walled chamber, a gasket sealing the connection of said other wall with said walled chamber, and means to measure the deflection of the deflectible wall and thereby to determine the weight on the jack.

3. A weighing device comprising in combination, a tripod supported hydraulic jack including a stabilizing reach rod, a walled chamber interposed between the jack and reach rod, a wall of said chamber and said jack having therethrough a passage to admit the fluid from the jack to the chamber, the pressure of said fluid being proportional to the load on the jack, another wall of said chamber being deflectible by the pressure of said fluid in the chamber and means to measure the deflection of the deflectible wall and thereby to determine the weight on the jack.

4. A weighing device comprising in combination, a hydraulic jack, a walled chamber connected to the bottom of the hydraulic cylinder, the top of said chamber and the bottom of said cylinder having therethrough a passage to admit the fluid from the jack to the chamber, the pressure of said fluid being proportional to the load on the jack, the bottom of said chamber being deflectible by the pressure of said fluid in the chamber, a gasket sealing the connection of said chamber bottom with the chamber and means to measure the deflection of said wall and thereby to determine the weight on the jack.

5. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, a peripherally supported elastic member comprising another wall of said walled chamber, said member being deflectible by the pressure of said fluid in the walled chamber and means to measure the deflection of the elastic member and thereby to determine the weight on the jack.

6. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, an elastic member having a portion comprising another wall of said walled chamber, and a gasket sealing the connection of the wall portion of the member to the walled chamber, said member being deflected by the fluid in the walled chamber, an electrical conductor resistance means connected to and having portions moved with said member and in proportion thereto, the resistance of said resistance means varying with the movement imparted thereto by said member, and means to determine the variation of the resistance of said means and thereby to determine the weight on the jack.

7. A weighing device comprising in combination, a hydraulic jack, a walled chamber connected thereto, a wall of said chamber and said jack having therethrough a passage to admit the fluid from the jack to the chamber, the pressure of said fluid being proportional to the load on the jack, an anvil having an elastic base, the top of the anvil comprising another wall of said chamber and a gasket sealing the connection of the anvil top with the chamber, said base being deflected by the fluid in the chamber, an electrical conductor resistance means connected to and having portions moved with said base and in proportion thereto, the resistance of said resistance means varying with the movement imparted thereto by said base, and means to determine the variation of the resistance of said resistance means and thereby to determine the weight on the jack.

8. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, a peripherally supported elastic member comprising another wall of said walled chamber and a gasket sealing the connection of the member to the walled chamber, said member being deflected by the fluid in the walled chamber, an electrical conductor resistance means connected to and having portions moved with said member and in proportion thereto, the resistance of said resistance means varying with the movement imparted thereto by said member, and means to determine the variation of the resistance of said resistance means and thereby to determine the weight on the jack.

9. A weighing device comprising in combination, a hydraulic jack including a hydraulic chamber to receive fluid under pressure therein, a walled chamber adjacent and connected to the hydraulic chamber of said jack, the wall of said walled chamber and the wall of said jack forming said connection having therethrough a passage to admit the fluid from the jack to the walled chamber, the pressure of said fluid being proportional to the load on the jack, a peripherally supported elastic member comprising another wall of said walled chamber and a gasket sealing the connection of the member to the to the walled chamber, said member being deflected by the fluid in the walled chamber, a weight indicating gauge rigidly supported in relation to said walled chamber and indicator operating means contacting and operated by deflections of said member, thereby to indicate the weight of load on said jack.

JAMES N. BAKER.

REFERENCES CITED

The following references are of record in the file of this patent:

UNITED STATES PATENTS

| Number | Name | Date |
| --- | --- | --- |
| 1,972,578 | Wallichs et al. | Sept. 4, 1934 |
| 1,994,388 | Erichsen | Mar. 12, 1935 |
| 2,148,013 | Carlson | Feb. 21, 1939 |
| 2,173,493 | Peters | Sept. 19, 1939 |
| 2,324,769 | Davis | July 20, 1943 |
| 2,360,886 | Osterberg | Oct. 24, 1944 |
| 2,380,362 | Hem | July 10, 1945 |